Sept. 23, 1947. HENRI-GEORGES DOLL 2,427,950
METHOD AND APPARATUS FOR DETERMINING THE
DIP OF STRATA TRAVERSED BY A BOREHOLE
Filed Jan. 1, 1943 3 Sheets-Sheet 1

INVENTOR.
HENRI-GEORGES DOLL
BY
Hoguet, Neary & Campbell
ATTORNEYS

Sept. 23, 1947.    HENRI-GEORGES DOLL    2,427,950
METHOD AND APPARATUS FOR DETERMINING THE
DIP OF STRATA TRAVERSED BY A BOREHOLE
Filed Jan. 1, 1943    3 Sheets-Sheet 2

INVENTOR.
HENRI-GEORGES DOLL
BY
Hoguet, Neary & Campbell
ATTORNEYS

Patented Sept. 23, 1947

2,427,950

UNITED STATES PATENT OFFICE 2,427,950

METHOD AND APPARATUS FOR DETERMINING THE DIP OF STRATA TRAVERSED BY A BOREHOLE

Henri-Georges Doll, Houston, Tex., assignor to Schlumberger Well Surveying Corporation, Houston, Tex., a corporation of Delaware Application January 1, 1943, Serial No. 471,006

11 Claims. (Cl. 175—182)

The present invention relates to the determination of the angle and azimuthal direction of the dip of strata traversed by a bore hole drilled into the earth.

More particularly, it is concerned with a novel method and apparatus for determining the angle and azimuthal direction of the dip of any subterranean stratum by observing the manner in which a characteristic of the stratum varies with depth at different, laterally spaced apart positions in the bore hole, preferably in the vicinity of a boundary between the stratum and an adjacent stratum.

In the applicant's prior Patent No. 2,176,169 there is disclosed an electrical method and apparatus which enable the dip and azimuthal direction of earth formations to be deduced from spontaneous potential measurements made along the bore hole. This development advanced the art considerably since it eliminated the necessity for taking cores or samples of the formations which had been relied upon previously to provide information about the dip.

While the method described in the above mentioned Doll patent usually produces good results, it has been found that where certain types of formations are present, great care must be exercised if useful information is to be obtained. In certain territories, such as the Midcontinent, for example, long sections of non-porous, dense formations, such as dense limestone, gypsum and anhydrite, are encountered. In such cases, the spontaneous potential variations in the bore hole may be relatively small, so that indicating instruments of high sensitivity must be employed and great care must be exercised in the practice of the method in order to obtain the desired information. The requirements are sometimes difficult to meet in field operations.

It is an object of the present invention, accordingly, to provide a new and improved method and apparatus for effecting dip measurements of subterranean formations, by means of which the desired information may be obtained without exercising undue care and with indicating instruments of ordinary commercial sensitivity.

Another object of the invention is to provide a new and improved method and apparatus of the above character in which functions of a characteristic of a formation at three or more laterally spaced points in the bore hole are simultaneously exhibited, whereby the dip of the formation may be ascertained.

A further object of the invention is to provide a novel dip-determining method and apparatus in which the value of the dip obtained is not affected by variations in the diameter of the bore hole.

According to the invention, records are made simultaneously of functions of a characteristic of a formation at laterally spaced points in the bore hole, preferably in the vicinity of a boundary between the formation and an adjacent formation. At least three points are chosen, defining a plane extending transversely of the bore hole. For the sake of simplifying the calculations, the three points are preferably taken in a plane perpendicular to the axis of the bore hole.

The formation characteristic availed of in the method may be any characteristic that can be measured in situ. Suitable characteristics may include hardness, acoustical properties, magnetic permeability or retentivity, and electrical impedance or resistivity. While each of these characteristics might occasionally be applicable in certain specific cases, the electrical resistivity or impedance is by far the most useful for general purposes. Accordingly, the electrical resistivity will be taken as the formation characteristic in the following description.

Since bore holes are extremely small in diameter as compared to the lateral extent of the formations, the particular formation being examined will appear all around the bore hole, even though it may be inclined with respect to it. Hence, the characteristic of the formation at the three points of measurement will be substantially identical except that corresponding points on each record will be displaced longitudinally an amount depending upon the dip of the formation. From the three records thus obtained, the dip of the formation can be deduced.

The direction of the dip is determined by recording, in any suitable manner, the orientation of the three points of measurement, with respect to a direction of reference.

Certain formations traversed by a bore hole tend to be washed out to some extent by the drilling fluid, so that the dip of the formation can be determined in accordance with the invention from measurements of the diameter of the bore hole in the vicinity of the boundary between the formation and a hard, dense formation.

The invention may be better understood from the following detailed description of several representative embodiments illustrated in the accompanying drawings in which.

Figure 1:
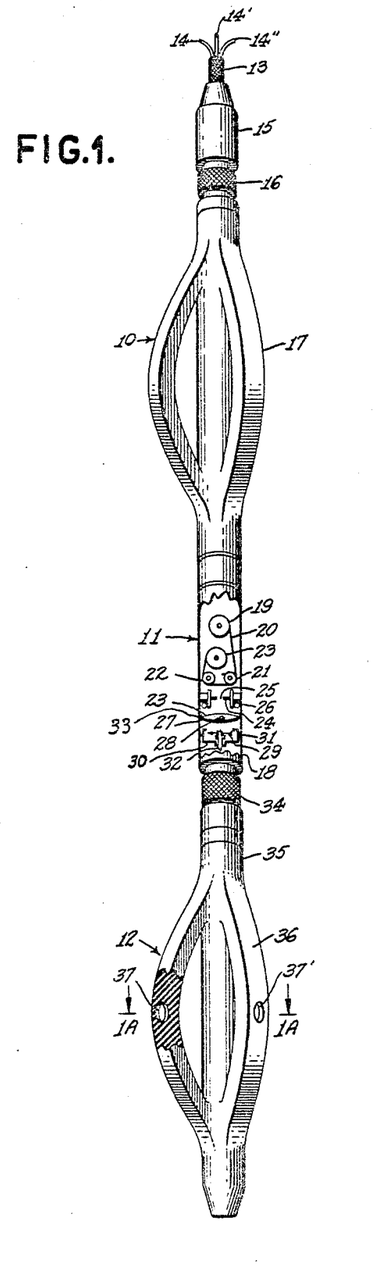
Figure 1 is an isometric view of the complete bore hole equipment for determining the angle and direction of dip of subsurface strata in accordance with the principles of this invention.

Referring to Figure 1, the bore hole equipment comprises a guide member assembly 10, an assembly 11 for indicating the deviation and direction of the deviation of the axis of the bore hole from vertical, and an electrode assembly 12 which substantially fills the hole and maintains a plurality of small electrodes closely adjacent the formations. The apparatus is lowered into the bore hole on a supporting cable 13 containing a plurality of insulated electrical conductors 14, 14' and 14" which provide communication between the bore hole equipment and the surface equipment (not shown). The cable 13 is attached to a head member 15 which is, in turn, connected by means of a coupling 16 to the guide assembly 10. The guide assembly 10 may be of any suitable type and may comprise, for example, three flexible members 17 equally spaced about the axis of the equipment as shown in the figure. The diameter of the assembly 10 is such that it maintains the axis of the equipment coincident with the axis of the bore hole (not shown).

Below the guide assembly 10 is mounted the assembly 11 for making deviation measurements. The assembly 11 may be a conventional well surveying instrument of the type well known in the art. It may be, for example, an instrument similar to that described in copending Doll application Serial No. 370,466, now Patent No. 2,338,028, dated December 28, 1943. The assembly 11 includes a non-magnetic, watertight case 18 within which is mounted a film magazine 19 from which a strip of film 20 passes over two laterally spaced rollers 21 and 22 to a film can 23. Below the film strip 20 is disposed a diaphragm 24 having a small aperture 25 in the center thereof. A series of electric lamps 26 are mounted below the diaphragm 24 to expose the film strip 20 when a record is to be made.

Mounted beneath the diaphragm 24 is the deviation measuring apparatus which comprises a concave, transparent member 27, a small opaque ball 28 which is adapted to roll along the concave member 27, and a magnetic compass needle 29. The magnetic needle 29 is pivotally mounted for universal movement on a framework 30 supported by the pivots 31. A pendulum 32 is suspended below the compass needle 29 and it serves to maintain the compass needle 29 in a horizontal plane regardless of the inclination of the axis of the instrument with respect to the vertical. A small marker 33 is mounted within case 18 in known relation to one of the electrodes on the assembly 12. The deviation measuring assembly 11 is rigidly connected to the guide assembly 12 by a standard coupling 34.

The electrode assembly 12 comprises an insulating framework 35 upon which are mounted a plurality of guide members 36 preferably made of neoprene, although any suitable resilient member covered with insulating material could be used. In the figure, three guide members 36 are shown spaced 120° apart. Mounted in the guide members 36 are a plurality of small electrodes 37, 37' and 37" which are adapted to be maintained in very closely spaced relationship to the formations adjacent the bore hole (not shown).

Figure 1A:
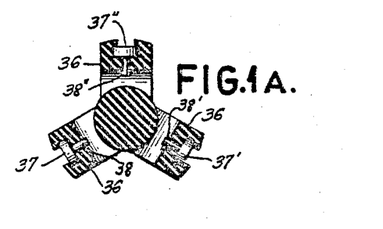
Figure 1A is an enlarged sectional view taken along line 1A—1A of Figure 1 showing the details of the electrode construction.

As shown in greater detail in Figure 1A, the electrodes 37, 37' and 37" are preferably disc-shaped and are disposed very near to the formation with only one face exposed. These electrodes are imbedded in the insulating material 36 and each is connected through a separate well insulated conductor 38, 38' and 38" to indicating apparatus as described below. All of the electrodes 37, 37' and 37" are identical, and they are preferably molded or vulcanized in place so that no liquid, such as the bore hole fluid, may contact an electrode at any place other than its exposed face. With this construction, the effect of the bore hole fluid upon the measurement is reduced to a minimum.

The electrodes 37, 37' and 37" may be made of any suitable material, such as lead, for example. As alternating or periodically reversed direct current usually passes through the electrodes during the making of resistivity or impedance measurements, the results will not be affected by polarization of the electrodes. If, however, direct current is to be used, the electrodes 37, 37' and 37" should preferably be of the non-polarizable type. As is well known in the art, an electrode may be made non-polarizable by surrounding it with a salt of the metal of which it is composed.

The electrodes 37, 37' and 37", and especially the portions of each exposed to the formations, are made rather small, and may be from ¼ to 1 inch in diameter, for example, in order that they may be regarded as point electrodes for all practical purposes. Since the current flowing in the circuits including these electrodes, is relatively small, they may be made small in size without producing an objectionably high current density through them. Small electrodes close to the formations enable much sharper and smaller variations to be observed than can be obtained when large electrodes are used or when the electrodes are farther removed from the formations.

Figures 4, 5, 6, 8, 9:
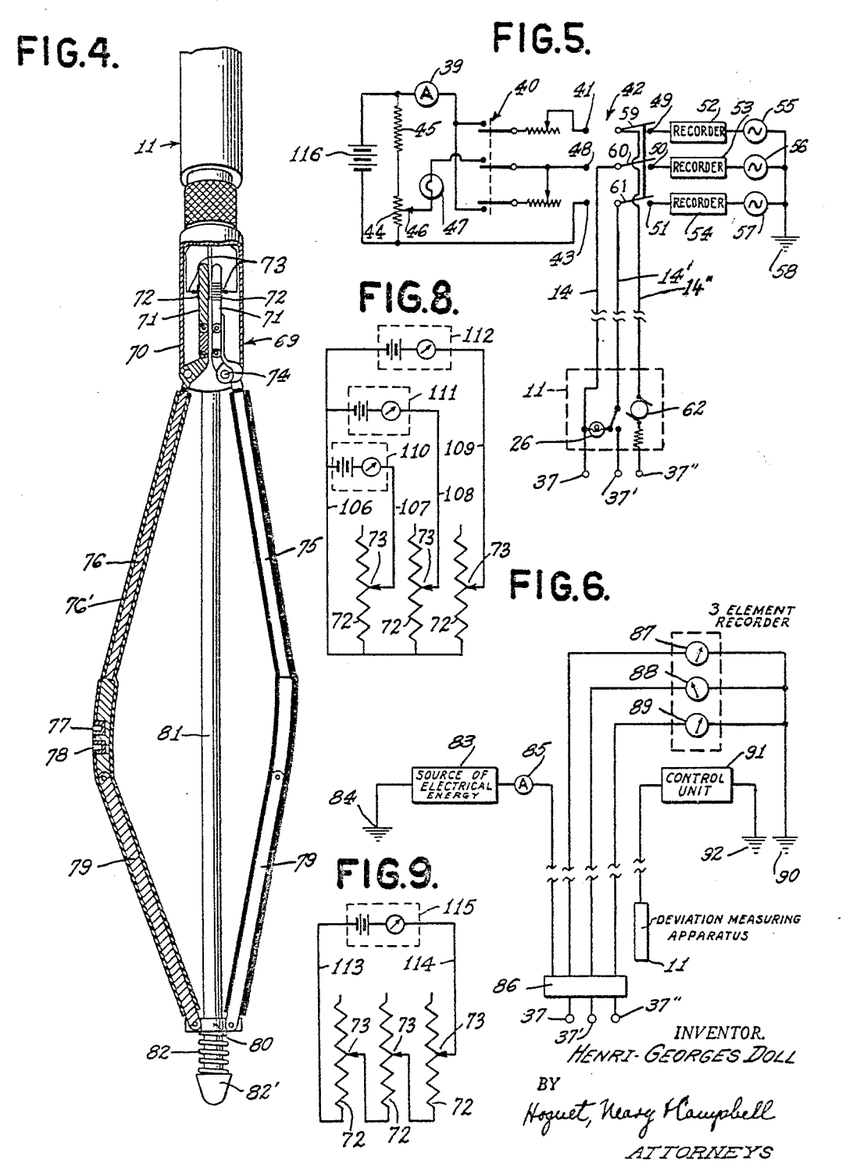
Figure 4 illustrates an alternate type of bore hole equipment by means of which the diameter of the hole may also be ascertained.
Figures 5, 6 and 7 are typical schematic wiring diagrams of the bore hole and surface equipment.
Figures 8 and 9 are schematic wiring diagrams illustrating alternate ways of connecting the electrical resistances in the bore hole diameter measuring equipment.

A typical wiring diagram is shown in Figure 5, in which either of two surface apparatuses may be selectively connected to the bore hole apparatus. The surface control equipment for the deviation measuring instrument 11 may be the same as that shown in Doll application Serial No. 370,466, and it comprises a source of direct current 116, one terminal of which is connected through an ammeter 39 and switch 40 to the terminal 41 of a three pole, double throw switch 42. The other pole of the source of electrical energy 116 is connected to a second terminal 43 of the switch 42. The source of electrical energy 116 is shunted by two series resistors 44 and 45 which are used as a potential divider, the variable contact 46 of which is connected through a pilot light 47, and the switch 40 to a third terminal 48 on the switch 42.

The switch 42 is also provided with a plurality of contacts 49, 50 and 51 which are connected through the recorders 52, 53 and 54, respectively, to the sources of electrical energy 55, 56 and 57, respectively, which are all grounded at the point 58 which may be the metallic sheath of the cable 13 (Figure 1) if it has one. The blades 59, 60 and 61 of the switch 42 are connected to the three conductors 14″, 14 and 14′ in the supporting cable 13 (Figure 1), which pass through the deviation measuring apparatus 11 and terminate at the three electrodes 37″, 37 and 37′.

Figure 2:
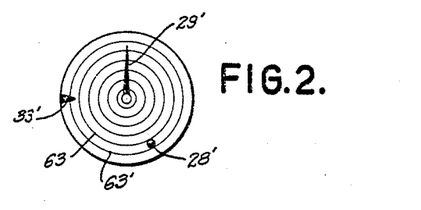
Figure 2 is a record of the deviation and direction of deviation of the bore hole from the vertical, the record bearing an identification mark indicating the azimuthal position of an electrode.

In operation, the apparatus is assembled as shown in Figure 1, the electrical connections being made as shown in the above mentioned co-pending application Serial No. 370,466. The apparatus is then lowered into the bore hole on the supporting cable 13, the guides 17 and 36 serving to maintain the axis of the equipment along the axis of the bore hole. When the bore hole apparatus has reached the bottom of the zone to be investigated, a record of the deviation of the axis of the bore hole from vertical is obtained by throwing the switch 42 (Figure 5) to the left, connecting the terminals 41, 48 and 43 to conductors 14″, 14 and 14′, respectively. The record of the deviation is obtained as fully disclosed in the above mentioned co-pending application Serial No. 370,466, for example. As there described, the switch 40 is thrown downwardly, illuminating the lights 26 and causing a photographic record of the position of the ball 28, the compass needle 29 and the marker 33 to be produced on the film strip 20 as shown in Figure 2. The switch 40 is then thrown to its upward position, which causes the motor 62 in the deviation measuring equipment 11 to move the film strip 20 and also to connect the middle conductor 14′ to the middle electrode 37′ (Figure 5), this event being indicated by the pilot lamp 47.

Figure 2 illustrates a typical record obtained by the deviation measuring assembly 11 of Figure 1. The record consists of a series of concentric circles 63, 63′ which represent the angular deviation of the axis of the deviation measuring instrument 11 from the vertical for various positions of the ball 28. The arrow 29′ on the record is a photograph of one end of the magnetic needle 29 and therefore denotes the direction of the magnetic north pole. The round dark spot 28′ is a photograph of the position of ball 28, and the position of the center of spot 28′ with regard to the graduated circles 63, 63′ denotes the angular deviation of the axis of the bore hole from the vertical. The identification mark 33′ denotes the azimuthal position of one of the electrodes, the electrode 37 for example, with respect to the magnetic north.

The switch 42 is then thrown to the right, connecting the three conductors 14″, 14 and 14′ to contacts 49, 50 and 51, respectively. This impresses electric currents of known character and value upon the electrodes 37, 37′ and 37″ from the sources 56, 57, and 55, respectively. If the voltages provided by the sources 55, 56 and 57 are maintained constant, the currents flowing through the electrodes 37, 37′ and 37″, respectively, will vary as a function of the electrical resistivities of the formations closely adjacent the electrodes. Thus, three separate resistivity curves 64, 64′ and 64″ may be simultaneously recorded as the equipment is raised in the bore hole, as illustrated in Figure 3.

Figure 3:
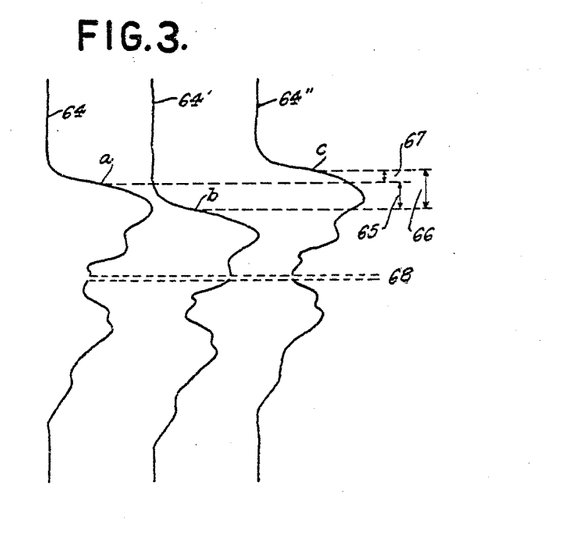
Figure 3 is a typical set of simultaneously recorded resistivity curves, the vertical displacements of which are used to determine the dip.

Referring to Figure 3, curves 64, 64′ and 64″ are three resistivity curves which are made simultaneously by the apparatus as indicated above. The curves 64, 64′ and 64″ are essentially identical in shape but are displaced vertically by the distances 65, 66 and 67 due to the difference in elevation of the strata along the three generatrices of the bore hole on which the electrodes 37, 37′ and 37″ move. Preferably, the records should bear a depth or time identification 68. This may be produced by connecting the lights illuminating the three galvanometers to a single source of electrical energy by a single switch. By momentarily opening this switch, an unexposed portion or identification mark 68 will appear on all the records. If a recorder is used in which all three curves are simultaneously formed on the same film, the mark 68 is unnecessary, provided, of course, that depths can otherwise be assigned to the records, such as is customarily done in electrical logging.

The film strip on which the three resistivity curves 64, 64′ and 64″ are recorded should move rather rapidly, that is, much more so than is customarily done in electrical logging operations. The travel of the film strip and the travel of the bore hole equipment may have a ratio of 1 to 4, for example. This is desirable in order that very short distances such as distances 65, 66 and 67 of Figure 3 may be accurately measured. At any desired time or times during the recording of the resistivity curve, identification marks such as the mark 68 on Figure 3 may be placed upon the film as previously described. By knowing accurately the depths at which these or other markers are placed on the film, the vertical distances between corresponding points upon the curves 64, 64′ and 64″ can be accurately measured.

A second deviation record similar to the one shown in Figure 2 should be made after the particular stratum of interest has been traversed. By comparing the two deviation records, it is possible to tell whether or not the bore hole equipment rotated during the recording of the resistivity curves. Normally, such rotation will not take place in the short zones measured. Alternately, the deviation measuring apparatus may be operated in the middle of the zone of interest and then vertical distances on the three curves taken from a point very near the marker 68.

By using the two records obtained, as illustrated in Figures 2 and 3, the dip of the strata and the direction of that dip can accurately be determined, regardless of the deviation of the axis of the bore hole. If the diameter of the assembly 12, that is, the lateral spacing of the electrodes 37, 37′ and 37″ is known, the three corresponding points a, b, c on the curves 64, 64′ and 64″ define a plane which in this case is the plane of the dip of the strata referred to the axis of the bore hole. The direction of that dip may be ascertained by noting the azimuthal direction of the marker 33′, since it is known, for example, that this marker is directly above the electrode 37. Hence, if the marker 33′ is east, then the point a in the plane of the dip is east, if the curve 64 is recorded by the circuit including electrode 37 (Figure 5). The dip and the direction of dip of the strata is then accurately determined in regard to the axis of the bore hole.

By reading the position of the spot 28′ of Figure 2 and its azimuthal position from the magnetic north, the inclination and direction of inclination of the axis of the bore hole may then be computed in the customary fashion, and this information is then used to correct the dip to the true vertical.

For the dip determinations to be rigidly accurate, the electrodes 37, 37' and 37'' should be maintained adjacent to, or a known fixed distance from the formations adjacent the bore hole, and the diameter of the bore hole must be known. This is accomplished in the case of the apparatus of Figure 1 by the designing of the assembly 12 so that electrodes 37, 37' and 37'' are always maintained adjacent the formations and approximately the same distance from the axis. Occasionally, however, the washing action of the drilling mud causes the diameter of the hole to be enlarged opposite certain formations. It is possible to take advantage of this condition to increase the sensitivity and accuracy of the instrument by employing the modified apparatus shown in Figure 4, in which the electrodes are placed on expansive arms and are constantly maintained adjacent the formation regardless of the diameter of the hole, the diameter of the hole also being simultaneously or subsequently recorded.

Figure 7:
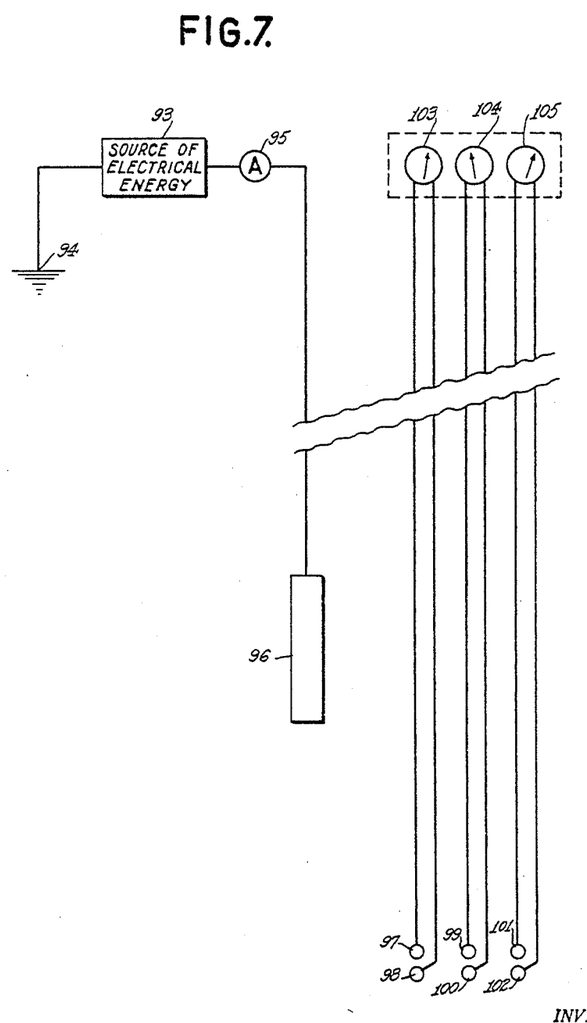

The assembly shown in Figure 4 is similar to that shown in Figure 1 except that lower electrode assembly 12 is replaced by an assembly 69 having expansive arms. In this modification, the axis of the bore hole equipment is maintained coincident with the axis of the bore hole by the guide member 10 and the deviation of the bore hole and the direction of one of the sets of electrodes are recorded as previously explained. The assembly 69 comprises a case 70 within which are mounted a plurality of members 71 on each of which is wound a movable resistance winding 72. The windings 72 are adapted to be engaged by stationary contacts 73, which are, in turn, connected to conductors leading to the surface. The members 71 are connected through linkages and pivots 74, as shown, to expansive arms, such as 75 for example. Any convenient number of expansive arms 75 may be employed, provided there are at least three. The construction of the arms 75 is such that a variation in the diameter of the bore hole produces vertical motion of the members 71 and of the resistance windings 72, thereby changing the electrical resistance in an electric circuit which is calibrated to indicate the diameter of the bore hole. The expansive arms 75 each consist of a metallic arm member 76, covered by suitable insulating material 76'. Any desired number of electrodes such as, for example, 77 and 78, are imbedded in the lower portion of each arm 75 and are suitably insulated therefrom. Each of the electrodes 77, 78 is connected by a separate insulated conductor (not shown) to the resistivity measuring apparatus at the surface as schematically illustrated in Figures 5, 6, or 7.

A second set of arms 79 are pivotally connected to arms 75 and also to a collar 80 which is slidably mounted on an insulating support 81 attached to the lower end of the case 70. A compression spring 82 mounted on the support 81 between the collar 80 and a lower stop member 82' continuously urges the arms 75 outwardly so that the electrodes 77, 78 will be adjacent the formations regardless of the diameter of the bore hole. The size and construction of the electrodes 77 and 78 are similar to those of Figure 1A.

The operation of the modification of Figure 4 is practically identical to that of Figure 1. If enough conductors are available in the supporting cable 13, the diameter of the bore hole may be continuously recorded at the same time that the resistivity curves are recorded. For example, the lower ends of the resistance windings 72 may be connected to a conductor 106 in the supporting cable 13 and the contacts 73 may be connected to the conductors 107, 108 and 109, respectively, as shown in Fig. 8. Conventional measuring devices 110, 111 and 112 respectively may be connected between the conductors 107, 108 and 109, respectively, and the common conductor 106. Alternatively, the resistance windings 72 may be connected in series to the conductors 113 and 114 in the supporting cable 13, resistance variations being measured by the measuring device 115, as shown in Fig. 9.

In the schematic diagram of Figure 5, the resistivity curves are obtained by what is commonly known as the single-electrode system, that is, the voltage supplied is held constant and the variations in current measured or vice versa. Figure 6 shows a modified schematic wiring diagram which could be employed with the apparatus of either Figure 1 or Figure 4. Figure 6 illustrates the two-electrode method of making resistivity measurements, a system which is well known in the electrical logging art. In this arrangement, one terminal of a suitable source of electrical energy 83 is grounded as at 84, its other terminal being connected through an ammeter 85 to a relatively large electrode 86 located in the bore hole at some distance above the three measuring electrodes 37, 37' and 37''. The electrodes 37, 37' and 37'' are connected to potential indicating type recorders 87, 88 and 89, respectively, which are all grounded as at 90. Both the measuring circuits and the current circuits are completed through the intervening earth. Any desired type of deviation measuring apparatus 11 is connected through a conductor in the supporting cable to a suitable control unit 91 at the surface of the earth, the other terminal of which may be grounded as at 92, if necessary.

The method of operation is well known in the art. An electric field is created in the formations by the current flowing from the electrode 86 which produces potential differences between the electrodes 37, 37', 37'' and ground 90. The potential differences between electrodes 37, 37' and 37'' and the ground 90 are recorded. By altering the vertical distance between the current electrode 86 and the measuring electrodes 37, 37' and 37'', the depth of investigation can be established at the desired value.

A schematic diagram of a third circuit which can be used with any type of dip measuring apparatus is shown in Figure 7. In this method of making resistivity or impedance measurements, what is commonly refered to as a three-electrode device is employed in a manner also well known in the prior art. With this arrangement, one terminal of a source of electrical energy 93 is grounded as at 94, its other terminal being connected through an ammeter 95 and one of the insulated conductors to a relatively large electrode 96 in the bore hole. Pairs of small electrodes such as 97, 98, 99, 100 and 101, 102 are respectively connected through insulated conductors in the supporting cable to three potential indicating instruments 103, 104 and 105 at the surface of the earth. The indicating instruments are arranged in such fashion that the instrument 103 measures the potential difference between the electrodes 97 and 98, while the potential difference between electrodes 99 and 100 is indicated by indicating instrument 104 and the potential difference appearing between electrodes 101 and 102 appears on the surface instrument 105.

While several specific embodiments of the dip determinating equipment have been illustrated and several schematic diagrams of known methods of making resistivity or impedance measurements have been described, it is to be understood that the invention is not limited to such methods and equipment. On the contrary, any known types of equipment, apparatus or measurements may be employed in accordance with the invention. However, any apparatus employed should be constructed or modified to permit local measurements to be obtained, that is, measurements which are predominately influenced by a small portion of the formation very close to the electrodes. Accordingly, it is necessary to use abnormally small electrodes positioned as close to the formations as possible. Moreover, each of the bore hole electrodes should have approximately the same exposed surface. Each of the wall engaging guides, such as 36 of Figure 1 or 75 of Figure 4, may be provided with any number of electrodes. If the guides each support one electrode, the circuits of either Figure 5 or Figure 6 may be employed; if they each support two electrodes, such as electrodes 77 and 78 of Figure 4, the circuit of Figure 7 may be employed. Obviously each wall engaging guide may support any desired number of electrodes and these electrodes may be employed in any appropriate electrical circuit.

Any of the many known types of deviation measuring instruments can be utilized in the dip determinating apparatus described above, provided means are added whereby the azimuthal position of one of the electrodes is denoted. If desired, the deviation and direction of deviation of the bore hole may be ascertained by the method taught in prior Patent No. 1,980,100 to C. Schlumberger. When employing this type of apparatus, the deviation of the bore hole is continuously indicated on an instrument at the surface of the earth, making it possible to complete the dip determinations without removing the equipment from the bore hole. It is further possible to accomplish the result with a supporting cable having a smaller number of insulated conductors by providing relay means in the bore hole equipment for changing electrical connections.

Thus, it may be seen that the present invention provides a method of determining the true dip and direction of dip of the strata at any depth in an uncased bore hole; one that can be used after the hole is completely drilled; one that does not require the taking of any mechanical cores; one in which all the computations may be completed at the location; and one that is relatively cheap and extremely reliable.

While several specific embodiments of the invention have been described above, the invention is not intended to be limited in any way thereby but is susceptible of numerous changes in form and detail within the scope of the appended claims.

I claim:

1. In apparatus for determining the dip of earth formations traversed by a bore hole, the combination of wall engaging means adapted for movement through the bore hole and having at least three relatively movable, insulated wall engaging members continuously urged into engagement with the wall of the bore hole, and at least one electrode imbedded in each of said wall engaging members and having a relatively small exposed conducting face closely adjacent to, and out of engagement with, the wall of the bore hole.

2. In apparatus for determining the dip of earth formations traversed by a bore hole, the combination of wall engaging means adapted for movement through the bore hole and having at least three wall engaging members, means for urging said wall engaging members continuously into engagement with the wall of the bore hole, means responsive to the displacement of said wall engaging members for modifying an electrical circuit in accordance with variations in the diameter of the bore hole, at least one insulated electrode imbedded in each of said wall engaging members and having a relatively small conducting portion closely adjacent the wall of the bore hole, and electrical means associated with said electrodes for simultaneously providing indications of variations at different depths of a characteristic of the surrounding earth formations.

3. Apparatus for determining the dip of earth formations traversed by a bore hole, comprising, wall engaging means adapted to be moved through the bore hole, said wall engaging means including at least three radially movable, insulated wall engaging members angularly spaced apart about the axis of the bore hole and continuously urged into engagement with the wall of the bore hole, at least one electrode imbedded in and carried by each of said wall engaging members at its wall engaging portion, each of said electrodes having a relatively small, exposed conducting face closely adjacent the surface of the wall engaging means, a plurality of recording means, and electrical means cooperating with said recording means and said electrodes for recording at least three curves showing variations in the electrical resistivity of the formations as measured at each of said electrodes.

4. Apparatus for determining the angle and azimuthal direction of the dip of earth formations traversed by a bore hole, comprising, wall engaging means adapted to be moved through the bore hole, said wall engaging means including at least three relatively movable, insulated wall engaging the members angularly spaced apart about the axis of the bore hole and continuously urged into engagement with the wall of the bore hole, at least one insulated electrode imbedded in and carried by each of said wall engaging members at its wall engaging portion, each of said electrodes having a relatively small conducting face closely adjacent the wall of the bore hole, means for providing indications of the inclination of the bore hole and of the orientation of one of said electrodes with respect to a reference direction, a plurality of recording means, and electrical means cooperating with said recording means and said electrodes for recording at least three curves showing variations in the electrical resistivity of the formations as measured at each of said electrodes.

5. Apparatus for determining the dip of earth formations traversed by a bore hole, comprising, wall engaging means adapted to be moved through the bore hole and including at least three wall engaging members, means for urging said members continuously into engagement with the wall of the bore hole, at least one electrode imbedded in each of said wall engaging members, each of said electrodes having a relatively small conducting face closely adjacent the wall of the bore hole, means responsive to displacements of said wall engaging members for modifying an electrical circuit in accordance with variations in the diameter of the bore hole, and a plurality of electrical recording means for recording at least three curves showing variations of a characteristic of the formations as measured at each of said electrodes.

6. Apparatus for determining the angle and azimuthal direction of the dip of earth formations traversed by a bore hole, comprising, wall engaging means adapted to be moved through the bore hole and including at least three wall engaging members, means for urging said members continuously into engagement with the wall of the bore hole, at least one electrode imbedded in each of said wall engaging members, each of said electrodes having a relatively small conducting face closely adjacent the wall of the bore hole, means responsive to displacements of said wall engaging members for modifying an electrical circuit in accordance with variations in the diameter of the bore hole, means for providing indications of the inclination of the bore hole and of the orientation of one of said electrodes with respect to a reference direction, and a plurality of electrical recording means for recording at least three curves showing variations of a characteristic of the formations as measured at each of said electrodes.

7. In apparatus for determining the dip of earth formations traversed by a bore hole, the combination of wall engaging means adapted for movement through the bore hole and having at least three relatively movable insulated wall engaging members continuously urged into engagement with the wall of the bore hole, and at least one electrode fixedly embedded in each of said wall engaging members and having a relatively small, exposed conducting face closely adjacent to a surface of a wall engaging member.

8. In a method of determining the dip of earth formations traversed by a bore hole containing a conducting liquid, the steps of disposing at least three small electrodes in the bore hole in close proximity to the wall thereof at locations that are angularly spaced apart about the axis of the bore hole, providing a path of free electrical communication between each of said electrodes and the small portion of the wall of the bore hole opposite thereto, substantially completely blocking off electrical communication between each of said electrodes and any bore hole liquid outside of said path, so that each of said electrodes is substantially unresponsive to the electrical properties of the bore hole liquid but is significantly responsive to the electrical properties of a relatively small portion of the earth formation in the immediate vicinity thereof, moving said electrodes through the bore hole as a unit, maintaining the distance relationship between each of said electrodes and the wall of the bore hole substantially constant regardless of variations in bore hole diameter, obtaining indications of the electrical resistivity of said relatively small portion of the earth formation in the immediate vicinity of each of said electrodes, and recording curves showing variations in the indications of electrical resistivity of the formations in said relatively small portions thereof in the immediate vicinity of said electrodes at various depths along said bore hole, whereby the dip of a formation may be determined from the longitudinal displacements of corresponding points on the curves so recorded.

9. In a method of determining the dip of earth formations traversed by a bore hole containing a conducting liquid, the steps of disposing at least three small electrodes in the bore hole in close proximity to the wall at locations that are angularly spaced apart about the axis of the bore hole, providing a path of free electrical communication between each of said electrodes and the small portion of the wall of the bore hole opposite thereto, substantially completely blocking off electrical communication between each of said electrodes and any bore hole liquid outside of said path, so that each of said electrodes is substantially unresponsive to the electrical properties of the bore hole liquid but is significantly responsive to the electrical properties of a relatively small portion of the earth formation in the immediate vicinity thereof, moving said electrodes through the bore hole as a unit, maintaining the distance relationship between each of said electrodes and the wall of the bore hole substantially constant regardless of variations in bore hole diameter, causing current from artificial source means to be continuously emitted from said electrodes and into the earth formations in the immediate vicinity thereof, obtaining indications of variations in the current emitted from said respective electrodes as they are moved through the bore hole, and also the successive depths in the bore hole at which indications of said current flow are obtained for each electrode, and comparing such measurements to determine the inclination of said earth formations.

10. In a method of determining the dip of earth formations traversed by a bore hole containing a conducting liquid, the steps of disposing in the bore hole at least three small electrodes that are angularly spaced apart about the axis of the bore hole in close proximity to the wall thereof in a plane substantially perpendicular to the axis of the bore hole, and a fourth larger electrode longitudinally spaced apart along the bore hole from said three electrodes, providing a path of free electrical communication between each of said three small electrodes and the small portion of the wall of the bore hole opposite thereto, substantially completely blocking off electrical communication between each of said three small electrodes and any bore hole liquid outside of said path, so that each of said small electrodes is substantially unresponsive to the electrical properties of the bore hole liquid but is significantly responsive to the electrical properties of a relatively small portion of the earth formation in the immediate vicinity thereof, moving said four electrodes through the bore hole as a unit, maintaining the distance relationship between each of said three small electrodes and the wall of the bore hole substantially constant regardless of variations in bore hole diameter, causing current from an artificial source to be continuously emitted from said fourth larger electrode and into the surrounding earth formations in the vicinity of said three small electrodes, recording as a function of depth in the bore hole variations in potential differences between each of said three small electrodes and a point of electrical reference, produced by current emitted from said fourth larger electrode, and comparing the records thus obtained to determine the inclination of said earth formations.

11. In a method of determining the dip of earth formations traversed by a bore hole containing a conducting liquid, the steps of disposing in the bore hole an electrode assembly comprising at least three pairs of electrodes positioned in close proximity to the wall of the bore hole, said pairs of electrodes being angularly spaced apart about the axis of the bore hole and the electrodes in each pair being longitudinally spaced apart along the bore hole, and a larger single electrode longitudinally spaced apart along the bore hole from said pairs of electrodes, providing a path of free electrical communication between each electrode in each of said pairs of electrodes and the small portion of the wall of the bore hole opposite thereto, substantially completely blocking off electrical communication between each electrode in each of said pairs of electrodes and any bore hole liquid outside of said path, so that each electrode in each pair of electrodes is substantially unresponsive to the electrical properties of the bore hole liquid but is significantly responsive to the electrical properties of a relatively small portion of the earth formation in the immediate vicinity thereof, moving said electrode assembly through the bore hole, maintaining the distance relationship between each of said pairs of electrodes and the wall of the bore hole substantially constant regardless of variations in bore hole diameter, causing current from an artificial source to be continuously emitted from said larger electrode and through the formations in the vicinity of said pairs of electrodes, recording variations of potential differences between the electrodes in each pair that are produced by the current emitted from said larger electrode, and comparing the records thus obtained to determine the inclination of said earth formations.

HENRI-GEORGES DOLL.

REFERENCES CITED

The following references are of record in the file of this patent:

UNITED STATES PATENTS

| Number | Name | Date |
|---|---|---|
| 2,133,786 | Neufeld | Oct. 18, 1938 |
| 2,172,778 | Taylor | Sept. 12, 1939 |
| 2,176,169 | Doll | Oct. 17, 1939 |
| 2,199,367 | Athy et al. | Apr. 30, 1940 |
| 2,206,891 | Hawley | July 9, 1940 |
| 2,210,795 | Cloud | Aug. 6, 1940 |
| 2,249,769 | Leonardon | July 22, 1941 |
| 2,307,887 | Haynes | Jan. 12, 1943 |
| 2,102,080 | Kinley | Dec. 14, 1937 |
| 2,367,110 | Kinley et al. | Dec. 23, 1941 |
| 2,072,950 | Huber | Mar. 9, 1937 |
| 2,317,259 | Doll | Apr. 20, 1943 |
| 2,132,807 | Rust | Oct. 11, 1938 |
| 2,313,384 | Lee | Mar. 9, 1943 |
| 2,340,987 | Robidoux | Feb. 8, 1944 |
| 2,392,357 | Bays | Jan. 8, 1946 |

FOREIGN PATENTS

| Number | Country | Date |
|---|---|---|
| 509,285 | Germany | Oct. 14, 1930 |

OTHER REFERENCES

"Shallow Penetration Curves," J. C. Stick, pp. 16–19 of vol. VIII, No. 2, "Tomorrow's Tools—Today," pub. 1942 by Lane-Wells Co., Los Angeles, Calif.

Certificate of Correction

Patent No. 2,427,950. September 23, 1947.

HENRI-GEORGES DOLL

It is hereby certified that errors appear in the printed specification of the above numbered patent requiring correction as follows: Column 1, line 38, for "The" read *These*; column 4, line 29, for "measurementis" read *measurements*; column 10, line 46, claim 4, before "members" strike out "the"; column 12, line 2, claim 9, after "wall" insert *thereof*; line 29, same claim, after "each" insert *such*; and that the said Letters Patent should be read with these corrections therein that the same may conform to the record of the case in the Patent Office.

Signed and sealed this 18th day of November, A. D. 1947.

[SEAL]

THOMAS F. MURPHY,
*Assistant Commissioner of Patents.*